United States Patent
Aoyama et al.

[11] Patent Number: 6,008,463
[45] Date of Patent: Dec. 28, 1999

[54] RESISTANCE WELDING ELECTRODE WITH GUIDE PIN

[76] Inventors: Yoshitaka Aoyama; Shoji Aoyama, both of 20-11, Makitsukadai 2-cho, Sakai-shi, Osaka-Lu, Japan

[21] Appl. No.: 08/913,103

[22] PCT Filed: May 9, 1997

[86] PCT No.: PCT/JP97/01563

§ 371 Date: Sep. 15, 1997

§ 102(e) Date: Sep. 15, 1997

[87] PCT Pub. No.: WO97/43076

PCT Pub. Date: Nov. 20, 1997

[30] Foreign Application Priority Data

| May 11, 1996 | [JP] | Japan | 8-152831 |
| Jun. 22, 1996 | [JP] | Japan | 8-196882 |
| Oct. 19, 1996 | [JP] | Japan | 8-312524 |

[51] Int. Cl.[6] ................................ B23K 11/30
[52] U.S. Cl. .............................. 219/119; 219/93
[58] Field of Search .................... 219/93, 119, 120

[56] References Cited

U.S. PATENT DOCUMENTS

| 2,623,974 | 12/1952 | Prucha | 219/93 |
| 3,657,509 | 4/1972 | Beneteau | 219/120 |
| 4,609,805 | 9/1986 | Tobita et al. | 219/93 |
| 5,285,044 | 2/1994 | Aoyama | 219/93 |
| 5,705,784 | 1/1998 | Aoyama et al. | 219/119 |

FOREIGN PATENT DOCUMENTS

| 57-146985 U | 9/1982 | Japan. |
| 2-20671 | 1/1990 | Japan. |
| 3-14083 U | 2/1991 | Japan. |
| 6-226458 | 8/1994 | Japan. |
| 6-30288 | 11/1994 | Japan. |
| 8-57660 | 3/1996 | Japan. |

Primary Examiner—Gregory Mills
Attorney, Agent, or Firm—Nikaido, Marmelstein, Murray & Oram LLP

[57] ABSTRACT

In an electrode for welding with a retractable guide pin so received in a guide hole of the electrode that air blows out from a gap between the guide hole and the guide pin as the guide pin is pushed in to prevent intervention of foreign matters between an end face of an electrode and a steel sheet part or at a sliding portion of the guide pin, a large-diameter hole (33) and a small-diameter hole (34) are provided at a portion through which passes a small-diameter portion (7) of the guide pin (6) so as to form a receiving face (35) with the difference in diameter between the two, and an exhaust passage is provided near the receiving face (35) to establish communication between the large-diameter hole (33) and outside of the electrode.

5 Claims, 5 Drawing Sheets

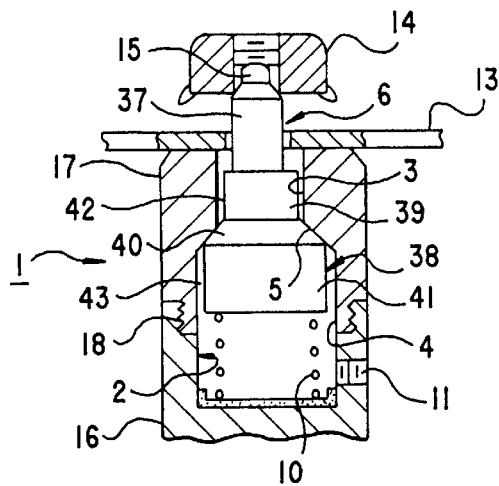
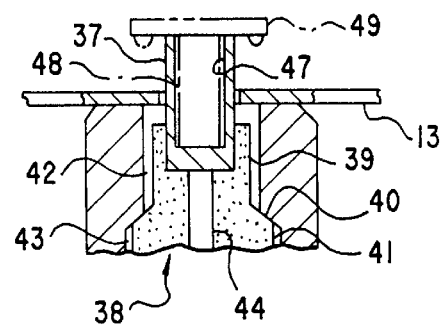
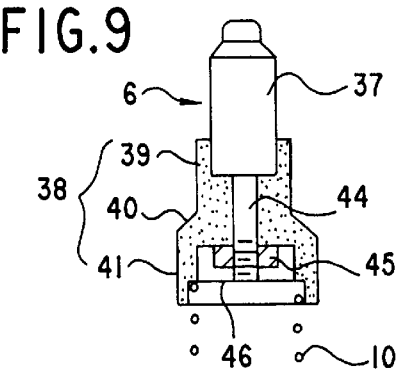
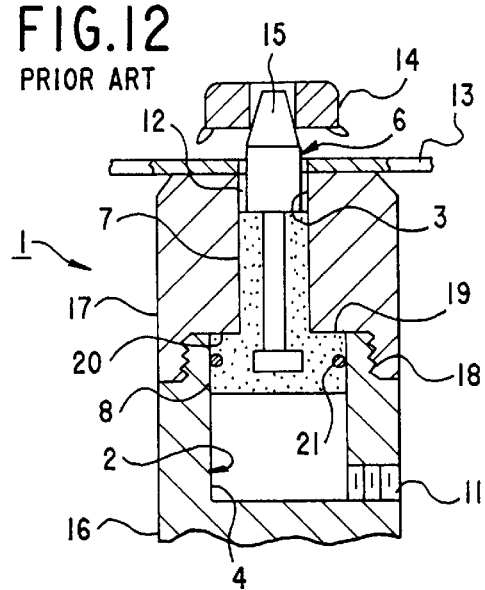
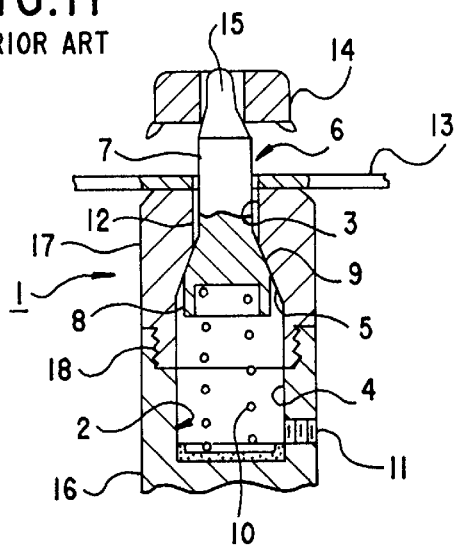
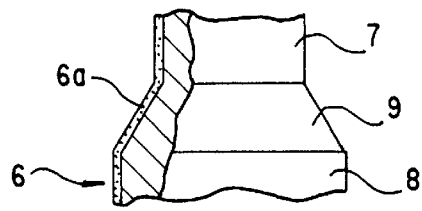

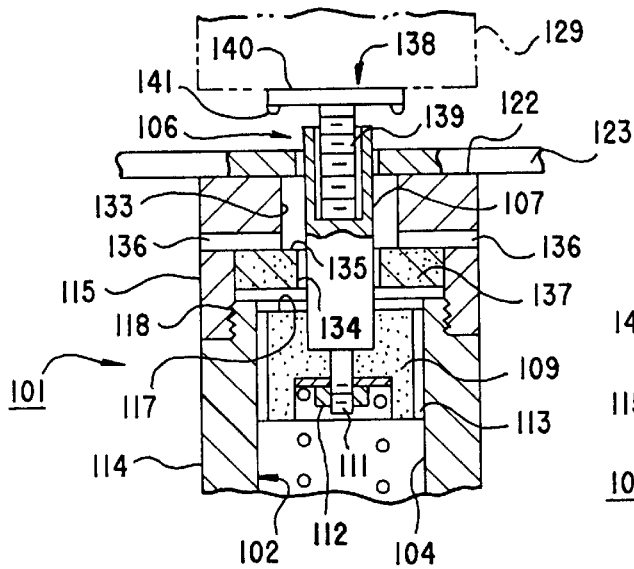
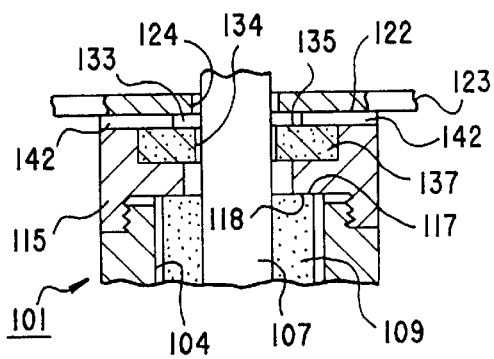
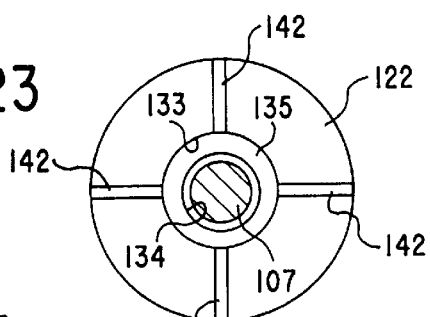
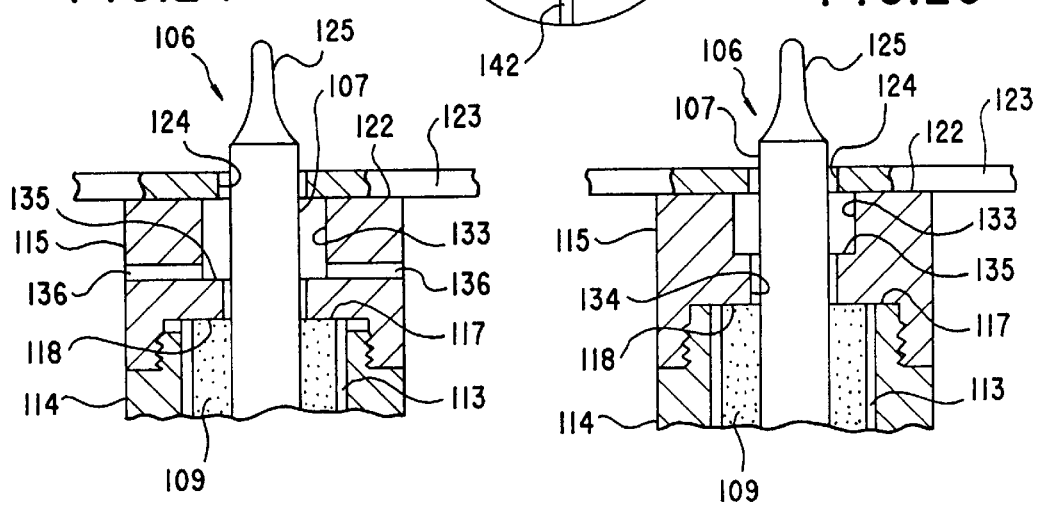
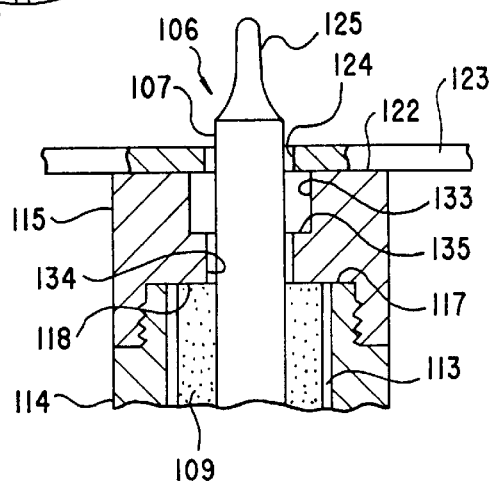

6,008,463

RESISTANCE WELDING ELECTRODE WITH GUIDE PIN

BACKGROUND ART

The present invention relates to an electrode for welding comprising a guide hole of a circular cross-section composed of a small-diameter hole and a large-diameter hole and a guide pin composed of a small-diameter portion and a large-diameter portion, the small-diameter portion and larger-diameter portion of the guide pin being fitted into the small-diameter hole and large-diameter hole of the guide hole, respectively, so that when the guide pin is displaced relative to the guide hole compressed air is allowed to jet out of a gap between the small-diameter hole and the small-diameter portion.

The prior art most closely related with the present invention is described in Japanese Utility Model Publication 54-9849 and Japanese Utility Model Publication 62-32714. The former is as shown in FIG. 11, and the latter in FIG. 12. Referring first to FIG. 11, a guide hole 2 in an electrode 1 is composed of a small-diameter hole 3 and a large-diameter hole 4, a conical seat 5 connecting the cylindrical walls of the holes 3 and 4. Similarly, a guide pin 6 is composed of a small-diameter portion 7 and a large-diameter portion 8, a conical portion 9 connecting the portions 7 and 8. A coil spring 10 is inserted in the guide hole 2 to push the guide pin 6 upward. An air port 11 for introducing compressed air is formed in the electrode 1. As shown, the conical portion 9 is in tight contact with the conical seat 5 under the action of the coil spring 10. A gap 12 is provided between the small-diameter hole 3 and small-diameter portion 7. A steel plate part 13 is positioned on the electrode 1 with the guide pin 6 passing through an opening formed in the part 13 and a tapered end 15 within a threaded hole of a projection nut 14 so as to be ready for the forward movement of a movable electrode (not shown) situated above the electrode 1. The electrode 1, made of copper alloy, is composed of a main body 16 and a cap 17 integrated through threaded parts 18, the outer shape and the guide hole 2 being both circular in cross-section. As the movable electrode advances to push the guide pin 6 down, the conical portion 9 is separated from the conical seat 5 to thereby allow compressed air from the air port 11 to pass through an annular gap thus formed over the conical portion and to jet out of the gap 12. As the movable electrode further advances, the projection nut 14 is pressed against the steel plate part 13, and when a welding current is turned on, the nut 14 and the steel plate part 13 are fusion-welded together. Spatter, which is produced during the process of fusion welding, is blown away by the air which jets out of the gap 12 and is prevented from entering the gap 12. The current of air also affords cooling to the electrode.

Referring to the prior art of FIG. 12, members having the same functions as in FIG. 11 are identified with same reference numerals as in FIG. 11 and their detailed description is omitted. An annular end surface, or a shoulder, 19 radially extending in a plane perpendicular to a longitudinal axis of the guide pin 6 is formed in the boundary of the large-diameter portion 8 and small-diameter portion 7, while an inner end surface, or an annular seat, 20 of the large-diameter hole 4 is formed in the boundary of the large-diameter hole 4 and small-diameter hole 3, with an O-ring for airtight sealing fitted into the large-diameter portion 8. The operation in the FIG. 12 arrangement is similar to that described in relation to FIG. 11 with the exception that compressed air does not jet out of the gap 12 but is fed simply to push up the guide pin 6, while the air tightness is kept by the O-ring. Hence, no countermeasure against nor cooling action is contemplated in this case.

The prior art had the following problems. In the FIG. 11 arrangement, when the guide pin 6 is pushed down to separate the conical portion and the conical seat, the guide pin 6 comes to float, and therefore, the guide pin 6 can itself become eccentric in the guide hole 2 until the projection nut 14 is pressed against the steel plate part 13, causing the nut 14 to be welded to an improper position on the steel plate part 13. Moreover, unless the cone angle of the conical seat 5 and conical portion 9 is finished to an extremely high precision, the conical portion cannot come in contact with the conical seat in an airtight fashion, leading to plant air leaks which is very uneconomical. The problem inherent in the FIG. 12 arrangement is in that no scattering of spatter nor air cooling is available. That is, no consideration is given to spatter treatment and air cooling.

Although not specified in the utility model publication, in this type of guide pin, the entire surface is coated with ceramic for insulation and wear resistance. This is as shown in FIG. 13; for example, ceramic is sprayed to the surface of the guide pin 6 made of metal such as steel to form a coating layer 19. In such guide pin as described the coating layer 19 with a very rigid and rough surface can be extremely worn by the small-diameter hole 3 and conical seat 5, which results in that the relative position of the guide pin 6 itself with respect to the cap 17 in the diametrical direction, that is, the centering cannot be achieved sufficiently. This problem is particularly significant when the inner surface of the small-diameter hole 3 is worn. Moreover, when the conical part 15 is worn by the corner edges of the projection nut 14 so that the coating layer 19 is worn out to the extent that the nut comes into direct contact with the metal portion, the intrinsic insulating function is sacrificed.

DISCLOSURE OF INVENTION

In one aspect of the invention which is contemplated to solve the above described problems, an electrode comprises a guide hole of a circular cross-section composed of a small-diameter hole and a large-diameter hole, a guide pin composed of a small-diameter portion and a large-diameter portion, the small-diameter portion and larger-diameter portion of the guide pin being fitted into the small-diameter hole and large-diameter hole of the guide hole, respectively, so that when the guide pin is displaced relative to the guide hole, compressed air introduced from a port formed in the electrode is allowed to jet out of a gap between the small-diameter hole and the small-diameter portion, wherein the large-diameter portion of the guide pin is closely fitted into the large-diameter hole to form a guide portion, an end surface of the guide portion and an inner end surface of the large-diameter hole coming in contact with each other, and wherein an air passage is formed in the guide portion in the axial direction of the guide pin. Usually the end surface of the guide portion is in contact with the inner end surface of the large-diameter hole to completely shut off the compressed air. As the guide pin is displaced by a forward movement of a movable electrode, the entire guide pin moves smoothly, without deflection of its axis, which is due to the axial center setting function of the guide portion. As a result of the displacement of the guide pin, the end surface of the guide portion and the inner end surface of the large-diameter hole part to thereby allow the compressed air to jet out of the gap over the small-diameter portion.

The guide hole may have a medium-diameter hole formed between the small-diameter hole and large-diameter hole so that the large-diameter hole and the medium-diameter hole provide a principal inner end surface and a subsidiary inner end surface, respectively, wherein the guide pin has a medium-diameter portion formed between the small-diameter portion and large-diameter portion, so that the large-diameter portion and the medium-diameter portion provide a principal end surface and a subsidiary end surface, respectively, and wherein the principal end surface or subsidiary end surface of the guide portion or both come in surface and contact in an airtight fashion with the principal inner end surface or the subsidiary inner end surface or both, respectively.

The medium-diameter portion of the guide pin is closely fitted into the medium-diameter hole of the guide hole, the length over which the medium-diameter portion and the medium-diameter hole coexist being set shorter than the length by which the guide pin is displaced during the welding. The firm fitting blocks distribution of air in the medium-diameter portion to keep a highly airtight state. As the guide pin is displaced, the medium-diameter portion slides out of the medium-diameter hole to thereby allow the compressed the circulation route for the air to pass therethrough the axial center setting function of the guide portion ensures that the medium-diameter portion slides into and out of the medium-diameter hole.

The air passage may be provided by a flat portion formed on the outer circumference of the guide portion, so that the compressed air passes through the flat portion. Alternatively, the air passage may be provided by a recess formed in the outer circumference of the guide portion, so that the compressed air passes through the recess.

The small-diameter portion of the guide pin is made of metal, the large-diameter portion is made of synthetic resin, and the electrode is a metal of excellent electric conductivity, whereby the end surface of the guide portion is seated on the inner end surface of the metal with the softness of the synthetic resin, and the contact fitness, or conformability, in this contact region is excellent, making airtight sealing secure.

In another aspect of the invention, an electrode has a guide pin retained in a guide hole formed in the guide pin. The guide pin comprises a metal-made guide member adapted to extend through an opening in a plate form part and a nonmetallic seal member integral with the guide member, wherein the seal member is composed of a cylindrical protective part larger in diameter than the guide member, a base part larger in diameter than the protective part, and a conical part connecting the protective and base parts, ventilation gaps being formed between the protective part and the guide hole and between the base part and the guide hole, respectively since the seal member is made of material such as synthetic resin, occurrence of abnormal wear in the guide hole parts of the electrode can be avoided, and in particular the protective part prevents abnormal wear of inner surface of the small-diameter hole.

The guide member may advantageously has a hollow space formed therein to receive a projection bolt, functioning the same as described in relation to the projection nut.

In other aspect of the invention, the electrode has a guide pin inserted in the guide hole of the electrode in a way to be movable forward and backward is composed of a large-diameter portion sliding in the guide hole and a small-diameter portion protruding from the electrode and positioning the counterpart and that air blows out from the outer circumference of the guide pin as the guide pin is pushed in, characterized in that the guide hole through which passes the small-diameter portion is composed of a large-diameter hole and a small-diameter hole and that a discharge passage communicating between the large-diameter hole and outside the electrode is formed in the electrode. Foreign matters such as spatters, etc. which got into the large-diameter portion are discharged to outside the electrode with the air current flowing from the small-diameter hole to the discharge passage.

An annular receiving face may advantageously be provided by using the difference in inside diameter between the large-diameter hole and the small-diameter hole and a discharge passage may advantageously disposed near the receiving face to make foreign matters such as spatter coming in the large-diameter hole hit against the receiving face, so as to discharge the foreign matters to the outside of the electrode by means of an air current from the small-diameter hole and through the discharge passage. Foreign matters which penetrated through the positioning hole are stopped on the receiving face and are discharged to the outside of the electrode with the current of air.

The guide pin slides in the guide hole at its large-diameter portion and that, because the small-diameter portion has an extremely small sliding space in the small-diameter hole, the guide pin is substantially formed in a way to be supported at 2 points. Thanks to this construction, the guide pin does not easily incline even some force works on in the radial direction of the pin, and steadily discharges the function of centering.

The guide pin is made of metal at its small-diameter portion and of synthetic resin at its large-diameter portion, and that the small-diameter hole through which passes the small-diameter portion is formed in a synthetic resin member. It provides smooth sliding with metal because said two supporting points for sliding are both made of synthetic resin.

In still a further aspect of the invention, the electrode may have a guide pin inserted in a guide hole of the electrode in a way to be movable forward and backward, the guide pin being composed of a large-diameter portion sliding in the guide hole and a small-diameter portion protruding from the electrode, wherein the guide hole through which passes the small-diameter portion is composed of a large-diameter hole and a small-diameter hole and an annular receiving face is provided by using the difference in inside diameter between the large-diameter hole and the small-diameter hole. It is designed to make the foreign matters retained on the receiving face flow backward toward the large-diameter hole with the air current from the small-diameter hole.

Embodiments of the invention will now be described in conjunction with the accompanying drawings.

BRIEF DESCRIPTION OF DRAWINGS

FIG. 8 is a longitudinal sectional view showing another embodiment of the invention.

FIG. 9 is a longitudinal sectional view of a guide pin shown in FIG. 8.

FIG. 10 is a partial longitudinal sectional view showing a modification of the guide pin.

FIGS. 11 and 12 are longitudinal sectional views showing prior art.

FIG. 13 is a partial sectional view showing a coating layer of a guide pin.

FIG. 21 is a longitudinal sectional view similar to FIG. 18, showing a modification.

FIG. 22 is a partial longitudinal sectional view showing a modification of discharge passages.

FIG. 23 is a plan view of the modification shown in FIG. 22;

FIG. 24 is a longitudinal sectional view partly showing a modification of the receiving surface.

FIG. 25 is a longitudinal sectional view showing a modification doing away with the discharge passages.

BEST MODE FOR CARRYING OUT THE INVENTION

Figure 1:
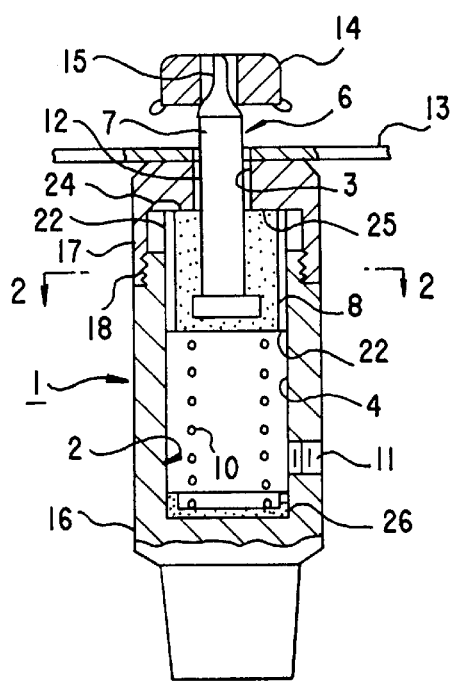
FIG. 1 is a longitudinal sectional view showing an embodiment of the invention.
Figure 2:
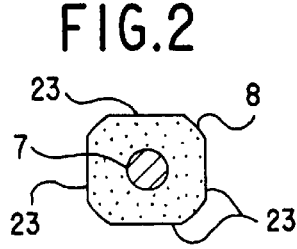
FIG. 2 is a cross-sectional view taken along the line A—A in FIG. 1.

Referring first to an embodiment shown in FIG. 1 and FIG. 2, in which components having the same functions as the members previously described in relation to FIG. 11 and FIG. 12 are identified with same reference numerals and detailed descriptions are omitted, a small-diameter portion 7 of a guide pin 6 is made of stainless steel, while a large-diameter portion 8 is made from a synthetic resin such as glass fiber filled Teflon and nylon. The small-diameter portion 7 and large-diameter portion 8 may be integrated in various ways; e.g., through screw threads, using a nut and, as is in this case, by molding the large-diameter portion 8 together with the small-diameter portion 7. An air passage 22 extending in the axial direction of the guide pin is provided, as is clear from FIG. 2, by forming a flat portion 23. A cap 17 and a main body 16 are made of conductive metal, such as copper alloy.

The large-diameter portion 8 is closely fitted into a guide hole 2 of a circular cross-section. By "closely" it is meant that the large-diameter portion 8 is longitudinally slidable in the guide hole 2, substantially without gap therebetween. In other words, without air passage 22, the large-diameter portion slides with very slight or no attendant flow of air. This is advantageous in that the entire guide pin 6 is not inclined even slightly, without only run-out and eccentricity. The large-diameter portion 8 serves as the guide portion, and the guide portion is also identified with reference numeral 8. The end surface 24 of the guide portion 8 and the inner end surface 25 of the large-diameter hole 4 come in contact with each end surface in a plane perpendicular to the longitudinal axis of the guide pin 6. Reference numeral 26 indicates an insulation plate.

As for the dimensions of the electrode, in the case of the projection nut as shown in the drawing, generally, the diameter of the electrode is 25 mm, the overall length of the electrode is 85 mm, and the diameter of the guide pin small-diameter portion is 7 mm.

Explaining the operation of this embodiment, FIG. 1 shows a state in which the guide pin 6 is pushed upward by the pressure of compressed air introduced from the port 11 and tension of the coil spring 10, so that the end surface 24 is closely seated on the inner end surface 25 to completely shut the compressed air off. As a movable electrode, not shown, moves forward to push down the nut 14, the surfaces 24 and 25 part to allow the compressed air to pass through the air passage 22 and between the surfaces 24 and 25, and then to jet out of the gap 12. In this state, the nut 14 is pressed against the steel plate part 13 and a welding current is turned on to complete the welding, the spatter splashing at this time being scattered by the compressed air so as not to enter the gap 12. The welding heat is cooled by the current of air. During this operation, since the guide portion 8 is closely fitted into the guide hole 4 without runout or eccentricity, the gap 12 is maintained uniformly over the entire circumference, ensuring uniform jets of air, while the position of the nut 14 relative to the steel plate part 13 is set correctly.

Figure 3:
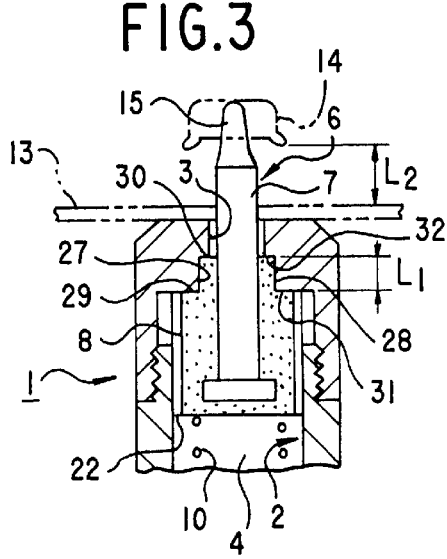
FIG. 3 is a partial longitudinal sectional view showing a modification.
Figure 4:
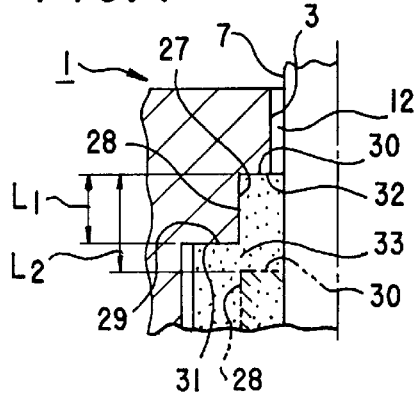
FIG. 4 is a view in an enlarged scale of part of FIG. 3.

FIG. 3 and FIG. 4 show a modification in which a medium-diameter hole 27 is formed between the small-diameter hole 3 and large-diameter hole 4 of the guide hole 2 thus providing a principal inner end surface 31 and a subsidiary inner end surface 32. Similarly, a medium-diameter portion 28 is formed between the small-diameter portion 7 and large-diameter portion 8 of the guide pin 6 thus providing, principal end surface 29 and subsidiary end surface 30. Although one medium-diameter portion is provided in the embodiment shown, two or more medium-diameter portions may be provided. The principal end surface 29 or subsidiary end surface 30 of the guide portion 8 or both are designed to come in contact with the principal inner end surface 31 or the subsidiary inner end surface 32 of the large-diameter hole 4 or both, respectively.

The medium-diameter portion 28 of the guide pin is fitted closely into the medium-diameter hole 27 of the guide hole. The axial length L1 over which they coexist is set shorter than the length L2 by which the guide pin 7 is displaced during the welding. As shown by the phantom line in FIG. 4, when the medium-diameter portion 28 slides out of the medium-diameter hole 27, a passage 33 is formed. The returning to the initial state, or the sliding of the portion 28 into the hole 27, facilitated by the centering function of the guide portion 8.

Figures 5, 6:
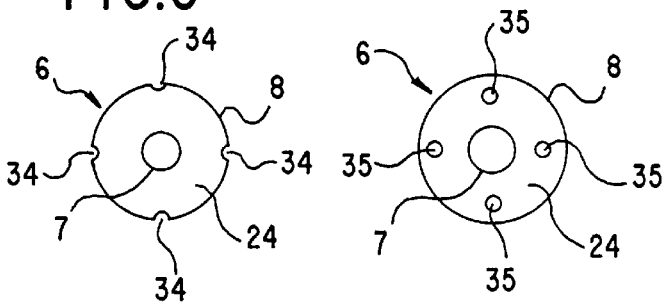
FIG. 5 is a plan view of a guide portion with recesses.
FIG. 6 is a plan view of a guide portion with through holes.

FIG. 5 and FIG. 6 show, respectively, modifications of the air passage 22. In the modification shown in FIG. 5, four axially extending recesses 34 are formed in the outer surface of the guide portion 8. Alternatively, in FIG. 6, four axially extending through holes 35 are formed near the outer circumference of the guide portion 8, each hole 35 opening at opposite end surfaces of the guide portion 8.

Figure 7:
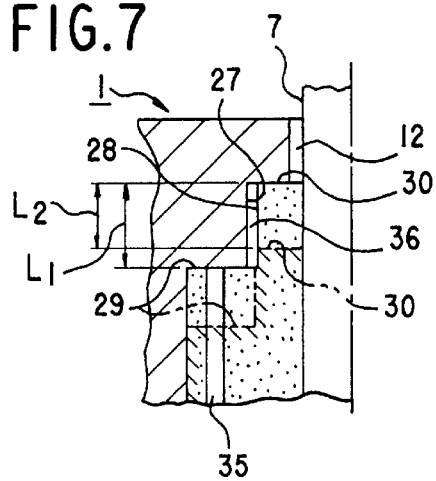
FIG. 7 is a view similar to FIG. 4, showing a different modification.

In modification shown in FIG. 7, the medium-diameter hole 27 and medium-diameter portion 28 are not fitted closely, but rather there is a gap 36 while the length L1 is longer than the length L2 as opposed to the FIG. 4 embodiment.

As has been described so far, the guide portion of the guide pin fits closely into the large-diameter portion of the guide hole, and the end surface of the guide portion and the inner end surface of the large-diameter portion come in contact with each other, plane to plane, ensuring airtightness without the need for complicated taper surface processing as in the prior art. Moreover, the guide portion is fitted so that any run-out or eccentricity of the guide pin can not occur, and therefore, not only the gap in the region of the small-diameter portion is maintained uniformly over the whole circumference, but also the positioning of the projection nut relative to the steel plate part is kept at high precision. The surface contact, or plane to plane contact, achieved by employing a stepped structure for the guide hole and a corresponding stepped structure for guide pin is very advantageous for keeping airtight.

Since the medium-diameter portion fits closely inside the medium-diameter hole, the airtight keeping function is achieved in this fitting area. Even if foreign matter is caught between the end surfaces for some reason, leak of air is prevented by the airtight keeping function of the fitting area. Besides, the guide portion is responsible for centering function, to ensure that the medium-diameter portion slides in and out the medium-diameter hole very smoothly.

Since the large-diameter portion of the guide pin is made of synthetic resin, the air passage can be formed by the molding technique, which is very advantageous in manufacture. In the case where the air passage is formed by cutting, machinability is excellent and it is similarly beneficial. The end surface of synthetic resin is seated on the inner end surface of the large-diameter hole of the electrode which is made of metal, and therefore the initial fitting-in, or conformability, on the part of the synthetic resin is promoted, ensuring the air tightness.

In addition, the seating surfaces are each in a plane perpendicular to the axis of the guide pin, facilitating processing with precision, and hence it is advantageous for enhancement of air tightness. The length of the guide portion is about half the overall length of the guide pin, and hence very stable action is realized for prevention of run-out and eccentricity.

Another embodiment of the invention will now be described referring to FIG. 8 and FIG. 9, in which those having the same functions as the members previously described are identified with same reference numerals, detailed description being omitted. A guide pin 6 is composed of a metal-made guide member 37, and a nonmetallic seal member 38 integral with the guide member 37. The seal member 38 is composed of a protective part 39 which is larger in diameter than the guide member 37, a base part 41 which is larger in diameter than the protective part 39, and a conical part 40 connecting the protecting part 39 and the base part 41. Ventilation gaps 42 and 43 are formed between the protective part 39 and small-diameter hole 3, and between the base part 41 and large-diameter hole 4, respectively. The electrode 1 and guide pin 6 are both circular in cross-section.

A shaft part 44 is formed integrally with the guide member 37 and extends through the seal member 38 with a nut 45 tightened to a threaded end thereof, so that the guide member 37 and seal member 38 are integrated. The base part 41 is in the form of a skirt as shown in FIG. 9 with a coil spring 10 acting on a seat 46 formed in the base part. The guide member 37 is made of stainless steel or its alloy. The seal member 38 is most appropriately composed of a synthetic resin such as a glass fiber filled Teflon and nylon. As examples of dimensions of parts, the diameter of the guide member 37, protective part 39, and base part 41 is respectively 6 mm, 8 mm, and 20 mm, and the ventilation gaps 42, 43 are 0.5 mm, and the overall length of the guide pin 6 is 38 mm.

A modified form is shown in FIG. 10 in which the guide member 37 is hollow, reference numeral 47 denoting a hollow space. The part to be handled here is a projection bolt with a shaft 48 and a flange 49 integral with the shaft.

FIG. 8 shows the state in which the circulation of air is blocked by the conical part 40 brought into contact with the seat 5 by the action of compressed air from the port 11. When the nut 14 or the flange 49 is pushed down as a result of the downward movement of a movable electrode (not shown), the conical part 40 is spaced apart from the seat 5, allowing the compressed air to flow through the ventilation gaps 43 and 42 and out of the opening in the plate-form part 13. The current of compressed air not only prevents spatter from entering the opening but also affords cooling.

As has been described so far, since the conical part of non-metallic material is brought into tight contact with the metal-made seat, a valve action of high sealing effect is obtained by the fitness, or conformability, of the conical part. Moreover, since the protective part is non-metallic and is larger in diameter than the guide member, there is no metal to metal contact between the guide member and small-diameter hole, and hence the guide member will not wear the inner surface of the small-diameter hole. In this way, the ventilation gaps are always kept at a constant value and the durability of the electrode itself can be notably extended. If the metal-made guide member is slightly worn, the insulating function is achieved by the non-metallic seal member, and short-circuit of welding current does not take place.

Besides, a hollow space formed in the guide member facilitates the welding of the projection bolt and the like.

Referring now to FIG. 14 to FIG. 17, the guide hole 102 of the electrode 101 is composed of a small-diameter hole 103, a large-diameter hole 104 and a medium-diameter hole 105 formed between them. On the other hand, the guide pin 106 is composed of a small-diameter portion 107, a medium-diameter portion 108 and a large-diameter portion 109 in correspondence to the holes 103, 105 and 104, with a prescribed gap 110 between the small-diameter portion 107 and the small-diameter hole 103. The medium-diameter portion 108, which is of short length in axial direction, is slidably and closely fit inside the medium-diameter hole 105. The large-diameter portion 109 is also slidably and closely fit inside the large-diameter hole 104. The members mentioned above all have a circular cross-section.

The small-diameter portion 107 is of a metallic material such as stainless steel and has a bolt 111 integrally provided at its end part. The medium-diameter portion 108 and the large-diameter portion 109 are of synthetic resin material such as PTFE commercially available under Trade Mark Teflon. The small-diameter portion 107 is inserted in the synthetic resin portion, and the small-diameter portion 107 and the synthetic resin portion are integrated by tightening of a nut 112 on the bolt 111 protruding from the small-diameter portion 107. In the large-diameter portion 109 are provided air passages 113 defined by cut-away planes 113a indicated in FIG. 15. A cap 115 is integrated with the main body 114 of the electrode 101 by means of a thread 116.

Figure 14:
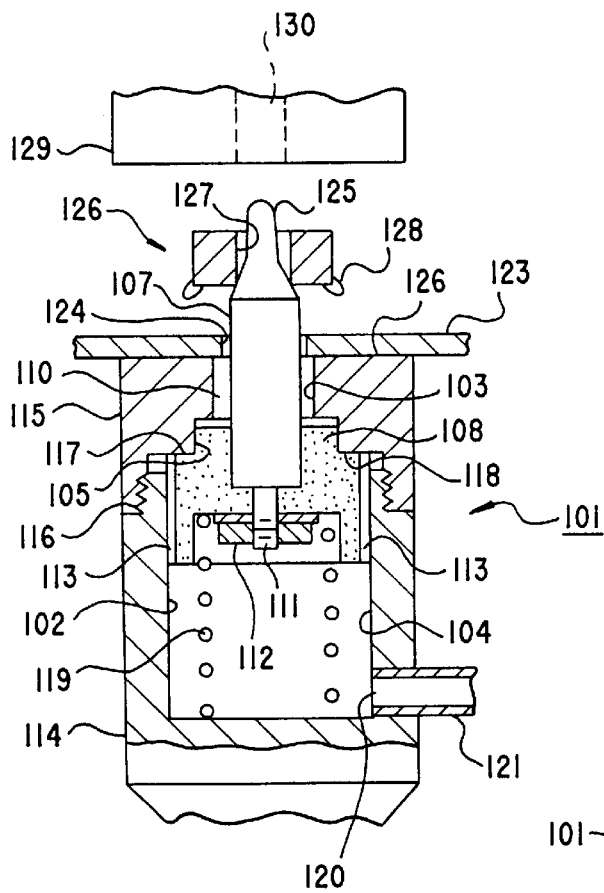
FIG. 14 is a longitudinal sectional view similar to FIG. 3.
Figure 15:
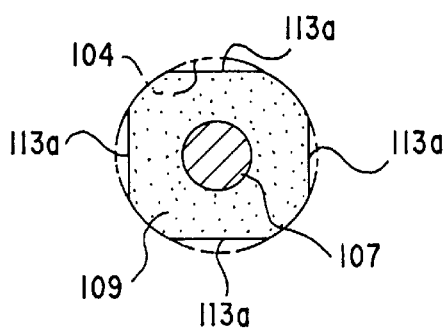
FIG. 15 is a cross-sectional view of the large-diameter portion shown in FIG. 14.

Since the end face 117 of the large-diameter portion 109 is in close contact with the inner end face 118 of the cap 115, compressed air to be described later is shut off, the close contact being assured by the tension of a compression coil spring 119 installed in the large-diameter hole 104. At the end part of the large-diameter hole 104 is formed a compressed air inlet 120 to which an air pipe 121 is connected. On an end face 122 of the electrode 101 is mounted a steel sheet part 123 on which a part is to be fixed by fusion welding, the small-diameter portion 107 passing through a positioning hole 124 drilled in that sheet part. On the small-diameter portion 107 is formed a supporting portion 125 which gradually gets smaller in diameter toward the tip. The part to be dealt with here is a projection nut 126 having a threaded hole 127 and projections 128 for fusion welding. An opening edge of the threaded hole 127 is in engagement with the supporting part 125 and supported as shown in FIG. 14. In this case, the electrode 101 is a fixed electrode while another electrode 129 paired with it is a movable electrode, a receiving hole 130 for supporting portion 125 being formed in the latter. The term 'closely' used herein means a state of fitting made in a way to enable sliding and air permeability but have substantially no play in the radial direction.

Figure 16:
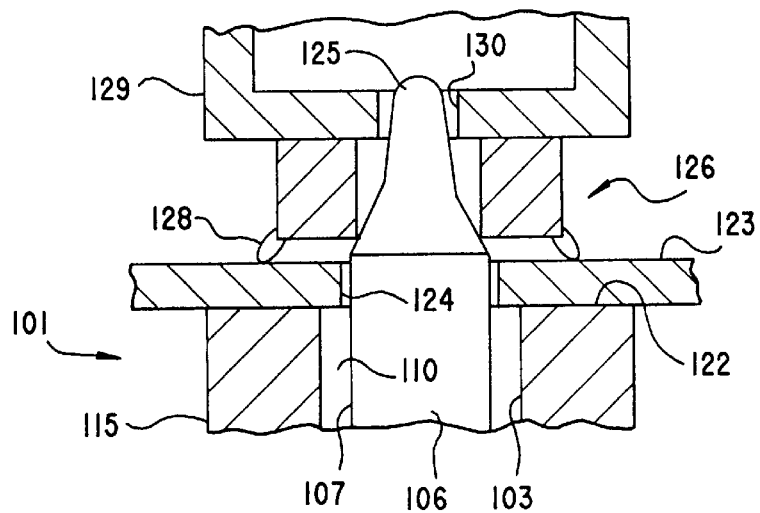
FIG. 16 is an enlarged sectional view of the main part of FIG. 14.

As the electrode 129 advances, it pushes down the nut 126 and, therefore, also pushes down the entire guide pin 106 at the same time. As the end face 117 separates from the end face 118 and the medium-diameter portion 108 gets out of the medium-diameter hole 105, compressed air passes from the passages 113 through the medium-diameter hole 105, the gap 110 and the positioning hole 124 to flow into the gap between the nut 126 and the steel plate part 123. When, after such process, the state of FIG. 16 is produced, an electric current passes between the electrodes, and the projections 128 are fused to complete the welding.

Figure 17:
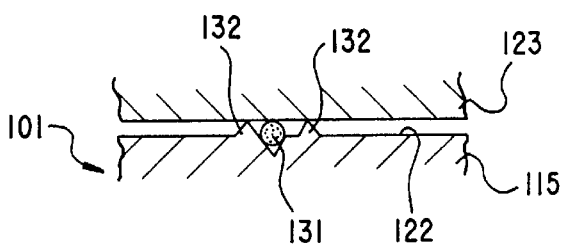
FIG. 17 is a longitudinal sectional view in an enlarged scale, showing a local state of the end face of electrode and the steel sheet part.

The positional accuracy in the recent nut welding is set in a way to make the gap between the small-diameter portion 107 and the positioning hole 124 extremely narrow, in pursuit of a high assembling accuracy in the case of car body, for example. To show an example of such dimensions, the inner diameter of the positioning hole 124 is 7.2 mm, the diameter of the small-diameter portion 107 is 6.8 mm, and the gap left for the passage of air is 0.2 mm on both the left and right sides in FIG. 16. Under such dimensional situation, immediately before the projections 128 are pressed against the steel plate part 123 as shown in FIG. 16, there exists a gap between the bottom face of the nut 126 and the top face of the steel plate part 123, because the projections 128 are not fused as yet. Therefore, the air current introduced into the gap 110 as a result of pressing down of the guide pin 106 flows out from the positioning hole 124 through the gap between the nut and the steel sheet part. However, since the inner diameter of the positioning hole 124 is set very small as mentioned above, the channel resistance at this point increases and the air pressure in the gap 110 gets high, to eventually make the steel plate part 123 slightly float from the end face 122 of the electrode 101. As a result, the air flows in a large volume toward the gap between the end face 122 and the steel plate part 123 rather than to the gap between the small-diameter portion 107 and the positioning hole 124, causing a problem of having foreign matter such as granular spatters and sand particles caught between the end face 122 and the steel plate part 123 at that time. If pressurization of and power application to the electrode 129 are made in this state, the foreign matter 131 bites into the end face 122 of the electrode as indicated in FIG. 17, so that the end face 122 deforms to cause a projection 132. The tip of the projection 132 touches the steel plate part 123, while a gap is produced at points other than this contact point as illustrated, making application of electric current impossible. Because it is in such state with only a slight contact surface area or rather a state close to point contact that electric power is applied, the current density at that point gets high and said point rapidly melts, causing splashing of the molten projection 132 even with no or incomplete fusion of the projections 128. The reason why the projection 132 is produced on the end face 122 side is that the electrode is made of a comparatively soft material such as chromium copper.

The reason why the spatters, etc. advance into the gap 110 is that, as the projections 128 fuse and the bottom face of the nut 126 sticks to the surface of the steel plate part 123, the air current stops because the channel of air flow is blocked and the spatters splash right and left from the respective portions of the projections 128 at that time, thus getting into the slight gap between the positioning hole 124 and the small-diameter portion 107. The foreign matters such as spatters which got into the gap 110 this way advance into the gap between the end face 122 and the steel plate part 123 when the channel of air flow is reopened.

Figure 18:
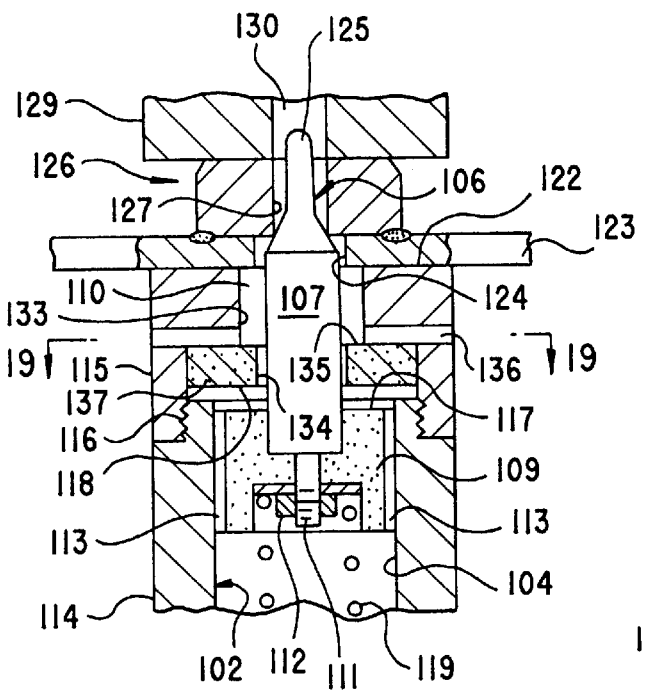
FIG. 18 is a longitudinal sectional view partly showing other embodiment of the invention.
Figure 19:
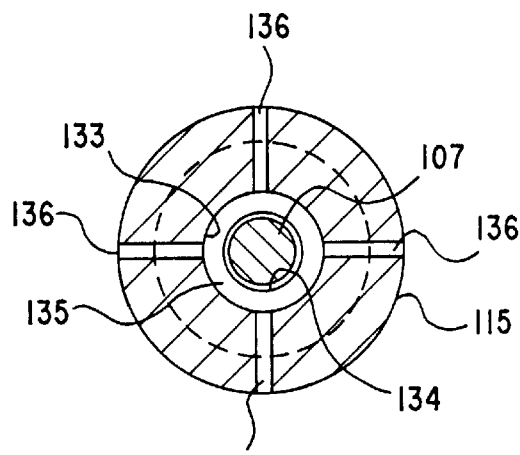
FIG. 19 is a sectional view taken along the line B—B in FIG. 18.
Figure 20:
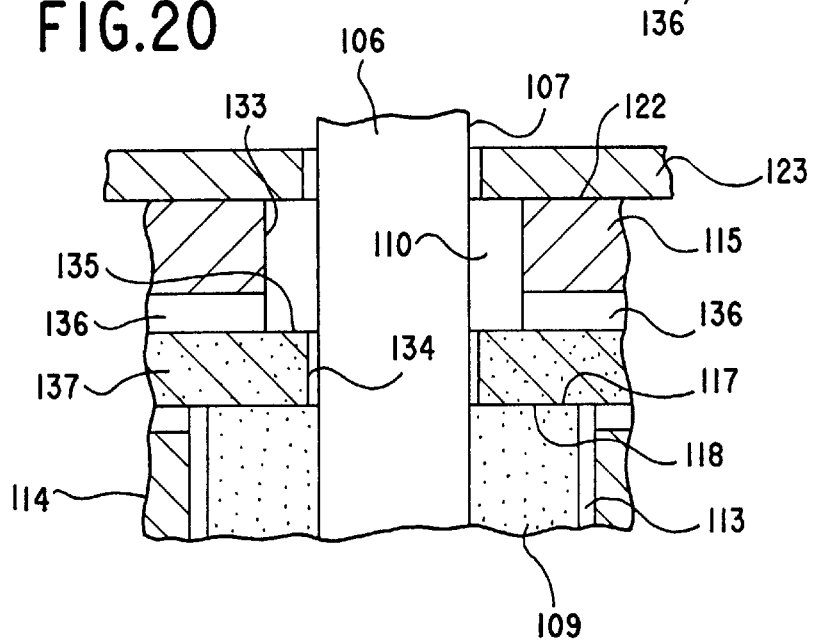
FIG. 20 is an enlarged sectional view of the main part of FIG. 18.

The embodiment shown in FIG. 18 to FIG. 20 is designed to obviate the abovementioned problem. FIG. 18 indicates the state in which the nut welding has just been completed and, therefore, it is a state where the end face 117 is separated from the inner end face 118, enabling passage of air. The bottom face of the nut 126 is in close contact with the surface of the steel sheet part 123 and the supporting portion 125 fits into the threaded hole 127, making it impossible for the air to flow out of the positioning hole 124. FIG. 20 shows a state in which the end face 117 is in close contact with the inner end face 118, blocking circulation of the air.

The guide hole 102 has a first large diameter bore 104 through which the large diameter portion 109 passes and a second bore through which passes the small-diameter portion 107. The second bore is composed of a large-diameter hole 133 and a small-diameter hole 134, and a receiving face 135 is formed with the difference in inside diameter between the two holes 133 and 134. Discharge passages 136 radially extending through the electrode to connect the large-diameter hole 133 with the outside of the electrode. The discharge passages 136 have inner ends disposed adjacently to the receiving face 135 to positively discharge any foreign matters that would otherwise remain on the receiving face 135 to the outside. The small-diameter hole 134 is drilled in a supporting plate 137 made of synthetic resin such as PTFE. The supporting plate 137 is press fit inside the cap 115 as shown in FIG. 18. To illustrate the dimensions of various parts in FIG. 20, the diameter of the small-diameter portion 107 is 6.8 mm, the inner diameter of the positioning hole 124 is 7.4 mm, the inner diameter of the large-diameter hole 133 is 8.5 mm, the inner diameter of the small-diameter hole 134 is 7.0 mm and, therefore, the width of the receiving face 135 is 0.75 mm. The gap between the small-diameter portion 107 and the small-diameter hole 134 is 0.1 mm each on both sides in FIG. 20. Such values show a state with hardly any play in the diametral direction and, therefore, the guide pin 106 is substantially supported at two points by the portion of the small-diameter hole 134 and the sliding part of the large-diameter portion 109. This means that two-point supporting works effectively on the centering and anti-inclination of the entire guide pin 106 when the pin is pressed down. The small-diameter portion 107 is of a metallic material such as stainless steel, while the large-diameter portion 109 is of a synthetic resin such as PTFE.

In the embodiment described above, since spatters splash both inwards and outwards in the transient period during which the nut 126 is pressed against the steel sheet part 123 with melting of the projections 128, part of such spatters advance from the positioning hole 124 into the gap 110. At this time, however, the spatters could not get into a small gap between the small-diameter portion 107 and the small-diameter hole 134 but hit the receiving surface 135, because a high-velocity air current is formed thererthrough. At that time, the air cannot flow out from the positioning hole 124 and, therefore, an air current passing from the small-diameter hole 134 toward the discharge passages 136 is positively formed. Consequently, foreign matters such as spatters are discharged through the discharge passages 136 to the outside of the electrode immediately after hitting the receiving face 135.

In a modification shown in FIG. 21, a projection bolt 138 is dealt with, which is composed of a shaft 139, a flange 140 and projections 141 for fusion welding. The small-diameter portion 107 of the guide pin 106 is a hollow pipe and the shaft 139 is inserted in it. The remainder in structure and the function of this modification are the same as in the previous embodiment.

FIGS. 22 and 23 show a modified form of the discharge passages; radially extending grooves 142 are formed in an end surface 122 of the cap (electrode). A supporting plate 137 is disposed close to the end surface 122 of the cap 115 so as to provide the receiving surface 135 adjacently to the inner ends of the grooves 142. Here, the end surface 117 is the same as that in the previous embodiment, while the inner end surface 118 is provided by the bottom surface of the cap 115. This modification has a shorter length of the large-diameter hole 133 compared with the previous one, but has the same actions as those described earlier.

FIG. 24 shows a modification in which the small-diameter hole 134 is drilled in the metallic portion of the cap 115.

FIG. 25 shows a further modification where the discharge passages (136) are eliminated and foreign matters, which penetrated through the positioning hole 124, are to be expelled upwardly with the air jet from the small-diameter hole 134 in the transient period when the steel sheet part 123 is being removed from the electrode after the welding has been finished.

As has been described so far, the air, which is constantly discharged from the discharge passages, keeps the air pressure pushing up the steel sheet part at a substantially negligible amount, and the end face of the electrode and the steel part get in a state of close contact, without air flow between the two. Therefore, there is no room for intervention of the foreign matters between the two, eliminating the short-circuit current application on the surface of the electrode and making it possible to protect the end face of the electrode against damage due to flying of sparks or melting. Furthermore, because a sufficient volume of air can be discharged from the discharge passage, this is quite suitable for discharging the welding heat. Since there is no intervention of foreign matters between the end face of the electrode and the steel sheet part, no gap is produced between the two and, therefore, any wasteful leakage of air can be prevented. And, since the air flow rate may simply be set for a volume sufficient for discharging foreign matters to the discharge passages, only the minimum required air volume is enough and this is very effective for energy saving. Because the guide hole through which passes the small-diameter portion is composed of a large-diameter hole and a small-diameter hole, the air jet from the small-diameter hole can be effectively utilized for discharging foreign matters.

Since the annular receiving face is provided with the difference in inside diameter between the large-diameter hole and the small-diameter hole and that the discharge passages are disposed near this receiving face, foreign matters coming into the large-diameter hole do not get into this small-diameter hole because of the high-velocity air current from the small-diameter hole but rather hit against the receiving face, and is discharged to the outside of the electrode by the air current passing from the small-diameter hole and through the discharge passages. Therefore, there is no fear of intervention of foreign matters in the point of close contact with the end face and the inner end face of the large-diameter hole and the small-diameter hole, completely preventing occurrence of any leakage of air.

The entire guide pin, which is supported at two points or at the large-diameter portion and the small-diameter portion in a way to be substantially free from any play, maintains a high stability even if some bending force acts on the supporting part of the small-diameter portion, without any inclination or eccentricity, and ensures a guiding function of high accuracy.

The guide pin is made of metal at the small-diameter portion and synthetic resin at the large-diameter portion, and the small-diameter hole through which passes the small-diameter portion is drilled in the synthetic resin member. This makes it possible for the sliding part of the guide pin at two points to maintain the sliding relation between synthetic resin and metal respectively. Consequently, the guide pin maintains smooth sliding even when the sliding gap is minimized, and maintains stable sliding since the synthetic resinn demonstrates cushioning effects in the diametral direction even if some bending force acts on the guide pin.

It is also possible, in the absence of the discharge passages and by the action of the air jet from the small-diameter hole and the receiving face, to make foreign matters penetrating into the large-diameter hole flow backward by means of air jet, and discharge the foreign matters from the large-diameter hole in the transient period when the steel sheet part is lifted.

We claim:

1. An electrode for welding in which a guide pin inserted in a guide hole of the electrode in a way to be movable forward and backward is composed of a large-diameter portion sliding in the guide hole and a small-diameter portion protruding from the electrode and that air blows out from the outer circumference of the guide pin as the guide pin is pushed in, characterized in that the guide hole has a first large-diameter bore through which passes the large-diameter portion and a second bore through which passes the small-diameter portion, that the second bore is composed of a large-diameter hole and a small-diameter hole adjacent the first bore, and that a discharge passage communicating between the large-diameter hole and the outside of the electrode is radially formed in the electrode.

2. An electrode for welding according to claim 1, wherein an annular receiving surface is formed between the large-diameter hole and the small-diameter hole on a side away from the first bore by using the difference in inside diameter between the large-diameter hole and the small-diameter hole and an inner end of the discharge passage is disposed adjacently to the receiving surface to cause foreign matters coming in the large-diameter hole to hit the receiving surface so that the foreign matters are carried outside the electrode by means of an air current from the small-diameter hole through the discharge passage.

3. An electrode for welding according to claim 1, wherein the small-diameter portion of the guide pin is slidably received in the small diameter hole with a slight amount of gap therebetween, thereby ensuring that the guide pin is supported at substantially two points.

4. An electrode for welding according to claim 1, wherein the guide pin is made of metal at its small-diameter portion and of a synthetic resin at its large-diameter portion, and wherein the small-diameter hole through which passes the small-diameter portion is formed in a synthetic resin member.

5. An electrode for welding with guide pin in which a guide pin inserted in a guide hole of the electrode in a way to be movable forward and backward is composed of a large-diameter portion sliding in the guide hole and a small-diameter portion protruding from the electrode and positioning a counterpart, characterized in that the guide hole has a first large-diameter bore through which passes the large-diameter portion and a second bore through which passes the small-diameter portion, that the second bore is composed of a large-diameter hole and a small-diameter hole adjacent the first bore, and that a ring-shaped receiving face is formed between the large-diameter hole and the small-diameter hole on a side away from the first bore by using the difference in inside diameter between the large-diameter hole and the small-diameter hole.

* * * * *